(12) United States Patent
Foundeur et al.

(10) Patent No.: US 7,567,690 B2
(45) Date of Patent: Jul. 28, 2009

(54) METHOD OF DETERMINING THE LIVING CHARACTER OF AN ELEMENT CARRYING A FINGERPRINT

(75) Inventors: Jean-Christophe Foundeur, Levallois-Perret (FR); Joel-Yann Fourre, Couveciennes (FR); Laurent Lambert, Paris (FR)

(73) Assignee: Sagem Securite, Paris (FR)

( * ) Notice: Subject to any disclaimer, the term of this patent is extended or adjusted under 35 U.S.C. 154(b) by 225 days.

(21) Appl. No.: 10/539,822

(22) PCT Filed: Dec. 19, 2003

(86) PCT No.: PCT/FR03/03803

§ 371 (c)(1),
(2), (4) Date: Feb. 3, 2006

(87) PCT Pub. No.: WO2004/061757

PCT Pub. Date: Jul. 22, 2004

(65) Prior Publication Data

US 2006/0140456 A1    Jun. 29, 2006

(30) Foreign Application Priority Data

Dec. 20, 2002   (FR) .................................. 02 16735

(51) Int. Cl.
*G06K 9/00*   (2006.01)
*G06F 7/04*   (2006.01)

(52) U.S. Cl. .................. 382/124; 382/115; 340/5.52; 340/5.53; 340/5.82; 340/5.84

(58) Field of Classification Search ................ 382/115, 382/124; 340/5.52, 5.53, 5.8–5.86
See application file for complete search history.

(56) References Cited

U.S. PATENT DOCUMENTS

| | | | | |
|---|---|---|---|---|
| 5,673,041 A | * | 9/1997 | Chatigny et al. | 341/22 |
| 5,864,296 A | * | 1/1999 | Upton | 340/5.53 |
| 5,920,640 A | * | 7/1999 | Salatino et al. | 382/124 |
| 5,943,441 A | * | 8/1999 | Michael | 382/199 |
| 5,953,441 A | * | 9/1999 | Setlak | 340/5.83 |
| 5,963,679 A | * | 10/1999 | Setlak | 382/312 |
| 6,052,475 A | * | 4/2000 | Upton | 382/125 |
| 6,067,368 A | * | 5/2000 | Setlak et al. | 382/124 |
| 6,175,641 B1 | * | 1/2001 | Kallo et al. | 382/124 |
| 6,259,804 B1 | * | 7/2001 | Setlak et al. | 382/124 |

(Continued)

OTHER PUBLICATIONS

Jarosz et al. "Large Scale Identification System Design", Chapter 9, pp. 1-25.*

(Continued)

*Primary Examiner*—Andrew W Johns
*Assistant Examiner*—Mia M Thomas
(74) *Attorney, Agent, or Firm*—Gerald E. Helget; Nelson R. Capes; Briggs and Morgan, P.A.

(57) ABSTRACT

The present invention concerns a method of determining the living character of an element carrying a fingerprint, consisting of making impedance measurements at various points on the said element by means of electrodes. The method according to the invention is characterised in that it consists of determining whether the said impedance measurements satisfy a law of variation of the impedance measured by the said electrodes as a function of the surface area of the said electrodes covered by the said elements such that $Z=f_{Dr}(S)$.

9 Claims, 4 Drawing Sheets

U.S. PATENT DOCUMENTS

| | | | |
|---|---|---|---|
| 6,282,304 B1 * | 8/2001 | Novikov et al. | 382/125 |
| 6,292,576 B1 * | 9/2001 | Brownlee | 382/124 |
| 6,310,683 B1 * | 10/2001 | Fujiwara et al. | 356/71 |
| 6,314,195 B1 * | 11/2001 | Fukuzumi | 382/115 |
| 6,333,989 B1 * | 12/2001 | Borza | 382/124 |
| 6,438,257 B1 * | 8/2002 | Morimura et al. | 382/124 |
| 6,633,656 B1 * | 10/2003 | Picard | 382/124 |
| 6,647,133 B1 * | 11/2003 | Morita et al. | 382/124 |
| 6,778,686 B1 * | 8/2004 | Hestnes et al. | 382/124 |
| 6,898,301 B2 * | 5/2005 | Iwanaga | 382/124 |
| 6,956,608 B1 * | 10/2005 | Shapiro et al. | 348/335 |
| 7,113,621 B2 * | 9/2006 | Hosokawa | 382/124 |
| 2003/0072475 A1 * | 4/2003 | Tamori | 382/124 |

OTHER PUBLICATIONS

Tartagni et al. "A fingerprint Sensor Based on the Feedback Capacitive Sensing Scheme", IEEE Journal of Solid State Circuits, vol. 33, No. 1, Jan. 1998, pp. 1-10.*

* cited by examiner

PL. 2

METHOD OF DETERMINING THE LIVING CHARACTER OF AN ELEMENT CARRYING A FINGERPRINT

BACKGROUND OF THE INVENTION

The present invention concerns a method of checking the living character of a finger by means of a fingerprint sensor. The invention also confirm the fingerprint sensor for implementing this method.

In general terms, any protected access becomes accessible to an authorized person by a means that he alone possesses. One of the means of limiting access to a person is to require the fingerprint of this person. The image of the fingerprint of a person is obtained by a fingerprint sensor. Once the image of the print is obtained by the sensor, it is transmitted to an image processing unit that compares the image obtained with a bank of print images so as to check that the print taken by the sensor is known. Recognition of the print by the image processing unit then opens up, to the person to whom the print corresponds, access to that which he seeks.

It has been found that, although identification by fingerprints is a known method, it still poses problems. This is because there are many forgers who attempt to deceive fingerprint sensors with imitations. The artifices in particular used are false fingers.

In order to thwart such forgers, several methods have been proposed for determining whether the element carrying the fingerprint is living. Certain methods use optical means. This is for example the case with the document U.S. Pat. No. 5,719,950, which describes a method consisting of measuring biometric parameters such as the oxygen level in the blood, the temperature of the skin, etc. The document U.S. Pat. No. 5,737,439 describes an optical measurement system for detecting blood flow by means of two wavelengths. Other methods consist of making electrical measurements. This is the case with the document JP-A-11197135, which describes the measurement of variations in capacitance between two electrodes, and the document U.S. Pat. No. 5,953,441, which describes a device for measuring the complex impedance of the finger and comparing it with reference curves which are a function of frequency.

It has been found that, through the methods already known, that the measurement of the impedance of the finger is one of the methods best suited to checking the living character of a finger, but which still sometimes happens to be deceived by imitations.

BRIEF SUMMARY OF THE INVENTION

The aim of the invention is therefore to propose a method of checking the living character of a finger which provides discrimination between a living finger and an imitation with certainty.

To this end, the invention concerns a method of determining the living character of an element carrying a fingerprint, consisting of making impedance measurements at various points on the said element by means of electrodes. The method is characterized in that it consists of determining whether the said impedance measurements satisfy a law of variation of the impedance measured by the said electrodes according to the surface area of the said electrodes covered by the said element such that $Z=f_{Dt}(S)$.

According to another characteristic of the invention, the method consists of measuring the impedance between two first electrodes with a predetermined surface area, measuring the impedance between two second electrodes with a predetermined surface area and checking that the points defined by the impedance and surface area values corresponding to the first and second electrodes belong to the same curve satisfying the said variation law.

According to another characteristic of the invention, the method consists, firstly, of making a first measurement of impedance between two first electrodes with a predetermined surface area and determining the curve satisfying the said variation law, and then secondly making a second measurement of impedance between two second electrodes with a predetermined surface area and checking that the point defined by the impedance and surface area values corresponding to the second electrodes belong to an area of tolerance situated around the predefined curve.

Advantageously, the said second impedance measurement is made randomly between two electrodes of the same size or between two electrodes of different sizes.

According to another characteristic of the invention, the said second impedance measurement is carried out alternately between two electrodes of the same size or between two electrodes of different sizes.

The present invention also concerns a fingerprint sensor making it possible to determine the living character of an element carrying a fingerprint. The sensor according to the invention is characterized in that it comprises at least two pairs of electrodes with different surface areas.

According to another characteristic of the invention, one of the said pairs of electrodes is composed of two small electrodes close together, designed to allow a local measurement of the impedance.

According to another characteristic of the invention, the said sensor comprises a first set of four single-piece electrodes with identical surface areas and a second set of two electrodes in the form of intersecting combs with identical surface areas.

According to another characteristic of the invention, the said sensor comprises an optical system designed to produce an image of the print and to determine the surface area of the measuring electrodes not entirely covered by the fingerprint.

The characteristics of the invention mentioned above as well as others will emerge more clearly from a reading of the following description of an example embodiment, the said description being given in relation to the accompanying drawings, amongst which:

DETAILED DESCRIPTION OF THE INVENTION

Figure 1:
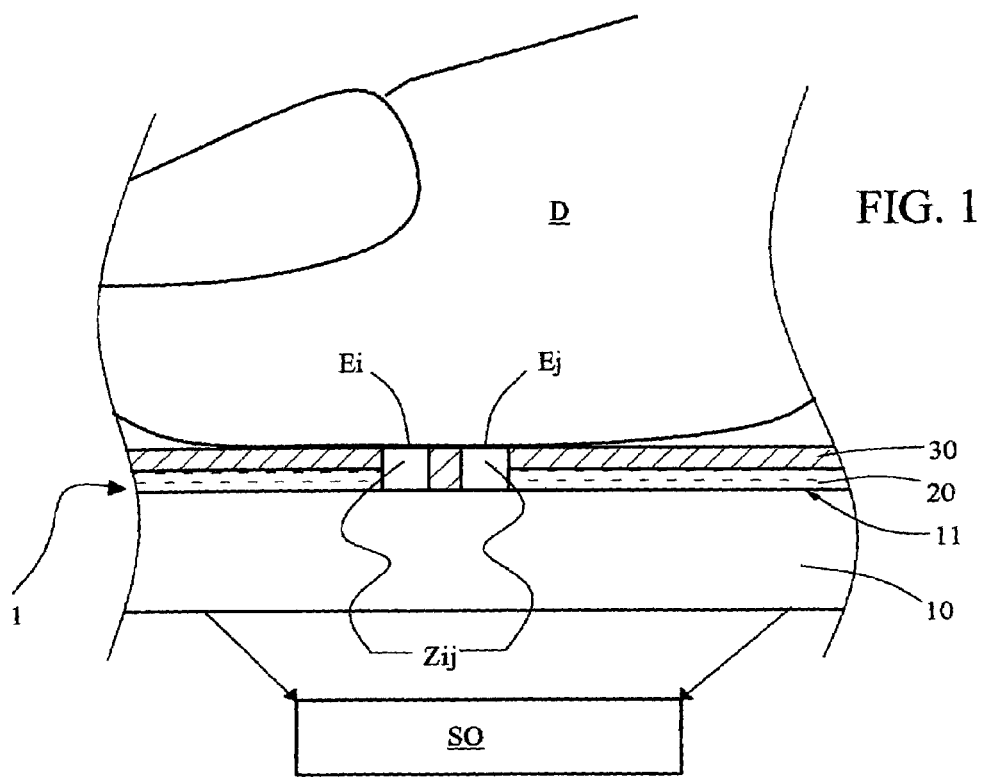
FIG. 1 depicts a view in section of a fingerprint sensor according to the invention on which an element carrying a fingerprint is placed.

The invention concerns a method of checking the living character of an element carrying a fingerprint by the measurement of impedance Z thereof. It should be noted in the following description that impedance measurement means both the measurement of impedance Z in itself and measurements of the type measuring resistance, capacitance, inductance, etc. The measurement of the impedance Z is carried out, as depicted in FIG. 1, by a fingerprint sensor 1 placed in contact with the element carrying the print, here represented by a finger D. An optical system SO is placed at the base of the sensor so as to produce an image of the print. The fingerprint sensor 1 according to the invention comprises a plate 10 of transparent material, for example glass or transparent plastics material, making the photographing of the print of the finger D optically possible. On the surface 11 of this plate 10 there are disposed electrodes Ei and Ej between which an impedance Zij is measured. The measurement of the impedance Zij between the electrodes Ei, Ej is made possible by virtue of conductive transparent connections 20. These connections 20, also placed in contact with the plate 10, must necessarily be conductive and transparent so as to allow the sensor 1 to fulfill both its function of image sensor and its function of checking the living character of the finger. The transparency of the connections 20 is preferably obtained by a vacuum deposition of a very fine layer of material, preferably ITO (Indium Tin Oxide), with a thickness of less than one micrometer. The whole of the surface of the sensor 1, with the exception of the electrodes Ei, Ej, is covered with a layer of insulating material 30 making it possible to offer only the electrodes Ei, Ej for contact with the finger D.

Figures 2A, 2B:
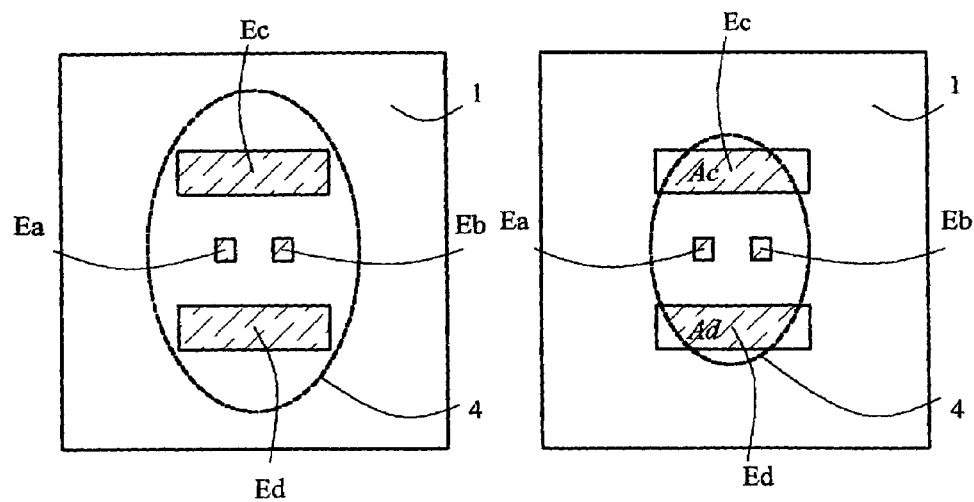
FIG. 2a depicts a schematic plan view of a fingerprint sensor whose electrodes are completely covered by a print.
FIG. 2b depicts a schematic plan view of a fingerprint sensor whose electrodes are partially covered by a print.

FIGS. 2a and 2b depict a plan view of a fingerprint sensor 1 according to the invention. In these Figs, the sensor 2 comprises two electrodes Ea, Eb, with a small surface area and two electrodes Ec, Ed with a larger surface area. These four electrodes are designed to make it possible to measure in pairs the impedance Z of the finger D which covers them with its print 4. Advantageously, the impedance Zab between the two smallest electrodes Ea and Eb is measured, and then the impedance Zcd between the two largest electrodes Ec and Ed.

Between FIG. 2a and FIG. 2b, the surface area S of the electrodes covered by the print 4 is different. This difference may stem from the difference in print between two fingers or the difference in pressure exerted on the sensor 1 by one and the same finger. In general terms, it will be noted that the surface Sij in question preferably corresponds to the smaller surface of the two surfaces of the electrodes Ei and Ej covered by the print 4 of the finger D. In other words, if, as depicted in FIG. 2a, the print 4 of the finger D entirely covers the electrodes Ec and Ed, the surface Scd in question will advantageously correspond to the surface of one of the electrodes Ec or Ed. If, as depicted in FIG. 2b, the print 4 does not entirely cover the electrodes Ec and Ed, the surface Scd in question will then advantageously correspond to the smaller of the areas Ac or Ad covered by the print 4 of the finger D. These areas Ac and Ad, which are hatched in FIG. 2b, are for example determined by means of the optical system SO placed under the sensor 1. Likewise, if the measurement of impedance Z is made between a small electrode Ea and a larger electrode Ec and the print 4 of the finger D does not entirely cover the electrodes as depicted in FIG. 2b, then the surface Sac in question will advantageously be the smaller surface taken between the surface Sa of the electrode Ea and the area Ac of the electrode Ec.

Figure 3:
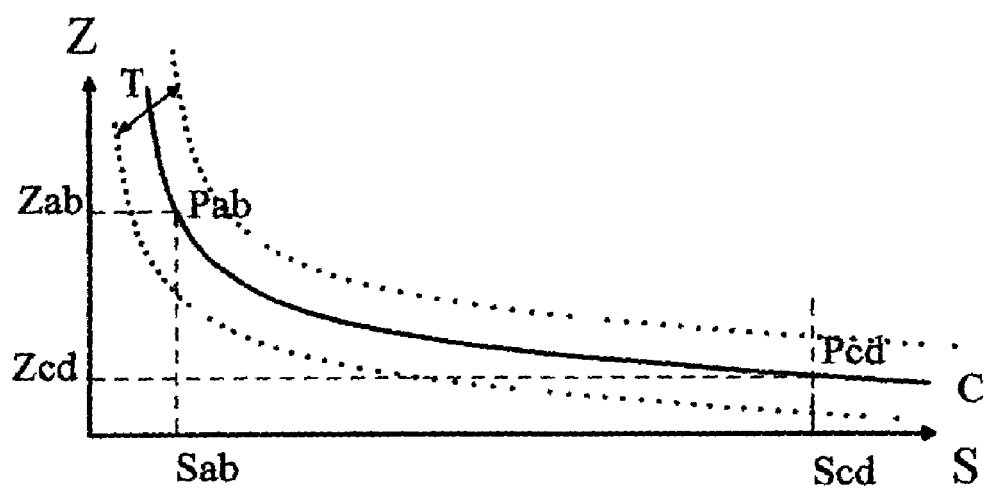
FIG. 3 depicts a law of variation for the impedance measured between two electrodes as a function of the surface area of these electrodes.

The method according to the invention is based on a statistical law of variation of the impedance Z measured between two electrodes according to the surface area S of these same electrodes. This variation law is depicted for a given figure D at a given time t in the form of a graph in FIG. 3. The curve shown in this Fig. is such that the impedance Z is proportional to the surface area S: $Z=f_{Dt}(S)$.

For a given finger D at a given time t, there exists only one curve. Based on this finding, an impedance Zab between the two small electrodes Ea and Eb is first measured. Knowing moreover the surface area Sab of the small electrodes Ea, Eb, the coordinates of a point Pab of one of the curves satisfying the variation law described above are therefore known. From this first measurement, the curve C corresponding to the finger D that satisfies the law is then determined.

Secondly it is checked that the impedance Z is constant over the whole of the finger D. For this purpose, the impedance Zcd between the two large electrodes Ec and Ed is measured. Knowing there also the surface area Scd of the large electrodes Ec and Ed, it is possible to place a point Pcd on the graph in FIG. 3. If the point Pcd obtained by this second measurement is situated in an area of tolerance T surrounding the curve C, it will be considered that the law is satisfied for this second point Pcd and therefore that the finger is living. The area of tolerance T corresponds approximately to a standard deviation b around the curve C such that T=2b. This standard deviation b varies according to statistical data.

It should be noted that it would also be possible to make the measurements of impedance Zab between the small electrodes and Zcd between the large electrodes at the same time, and then check that the points Pab and Pcd corresponding to the measurements made belong to the same curve.

Figure 4:
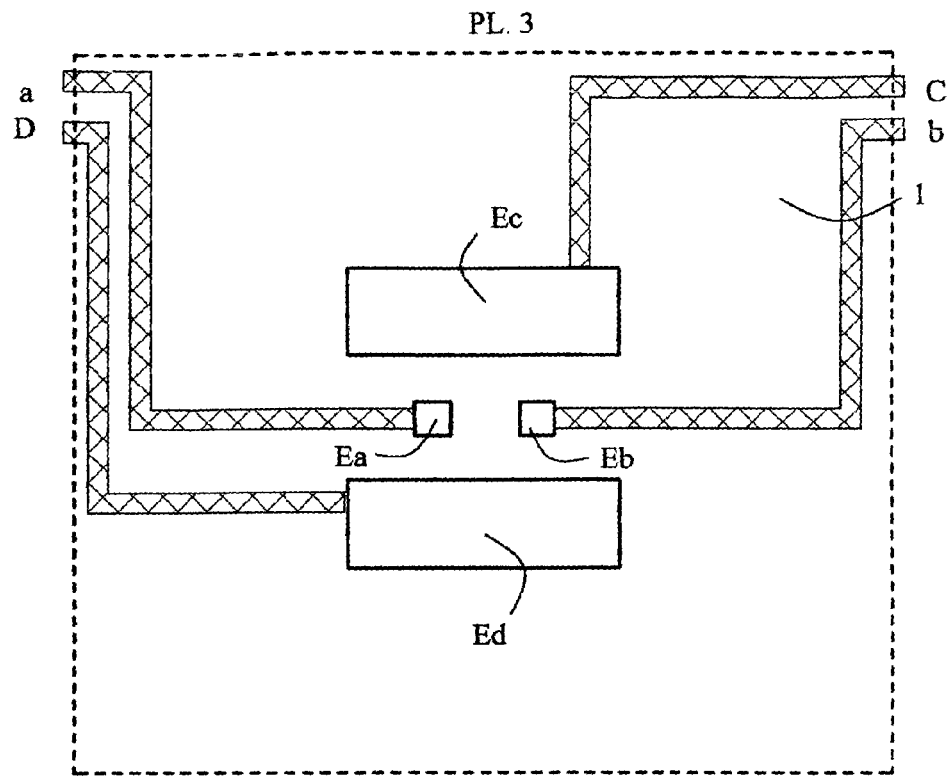
FIG. 4 depicts a first embodiment with four electrodes of a print sensor according to the invention.

The method is put into practice through the use of a fingerprint sensor 1. Several embodiments of the sensor 1 according to the invention are proposed. These various embodiments are depicted in FIGS. 4, 5, 6 and 7. FIG. 4 depicts a first embodiment of the fingerprint sensor according to the invention. In this first embodiment, the sensor 1 comprises two small electrodes Ea, Eb and two large electrodes Ec, Ed, that is to say two sets of two electrodes with identical surface areas within the same assembly. Each of the electrodes is connected by a connection 20, preferably made from ITO (Indium Tin Oxide), to an apparatus for measuring the impedance Z. Thus, in a first embodiment of the sensor, the method described above is implemented and it is checked by this means that the finger D is living.

One essential character of the invention satisfied for all the embodiments of the sensor is the random character of the impedance measurements. Random character means the possibility of making impedance measurements both between two small electrodes and between a small electrode and a large electrode and being able to reverse the electrodes used for measuring the impedance so as to thwart any forgers who may have understood the functioning of the sensor. Using the sensor depicted in FIG. 4, a third impedance measurement can therefore be carried out, for example alternately for one finger out of two, between the electrodes Ec and Ea and then between the electrodes Ed and Eb. This third measurement confirms the second measurement.

Figure 5:
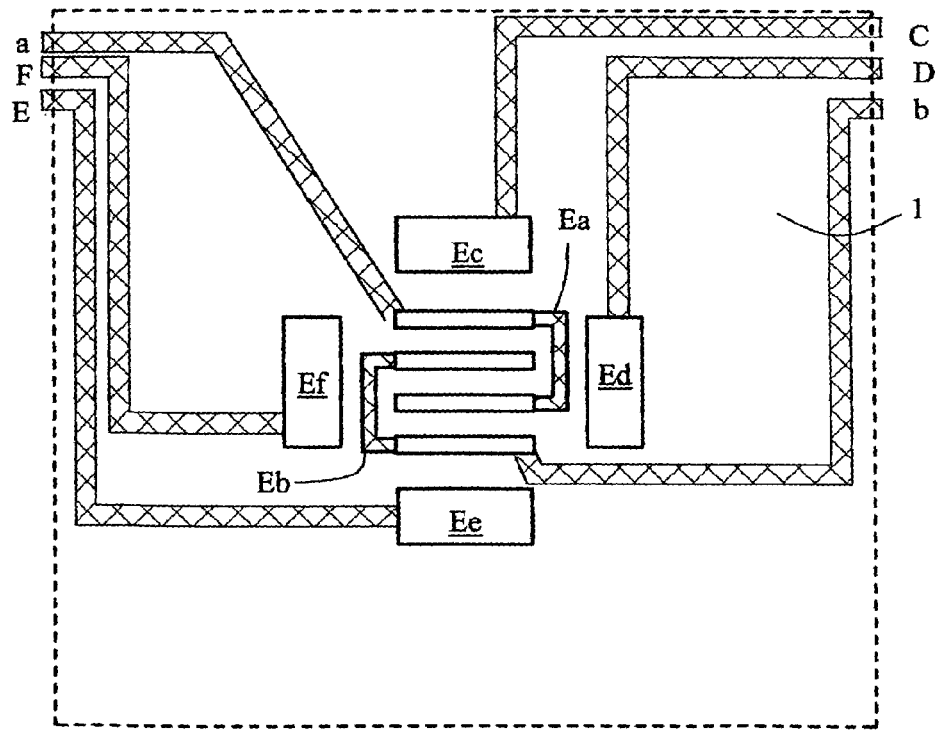
FIG. 5 depicts a second embodiment with six electrodes of a print sensor according to the invention.

FIG. 5 depicts a second embodiment of a fingerprint sensor according to the invention comprising six measuring electrodes. Amongst these six electrodes, there are four large electrodes Ec, Ed, Ee and Ef and two small electrodes Ea and Eb, that is to say a first set of four single-piece electrodes with identical surface areas and a second set of two electrodes in the form of intersecting combs with identical surface areas. The two small electrodes are each composed of two electrode parts electrically connected by a bead of conductive material advantageously made from ITO. The two parts of the same electrode are separated by a part of the other electrode so as to measure a very localized precise impedance. The impedance measurements are made in the following manner. The impedance Zab between the small electrodes Ea, Eb is measured and second and third impedances are measured, either between two of the large electrodes, for example between the electrodes Ec and Ee (Zce) and then Ef and Ed (Zfd) if these electrodes are covered by the finger D, or in the contrary case between a large electrode and a small electrode, for example between Ec and Ea (Zac) and between Ee and Eb (Zeb).

Figure 6:
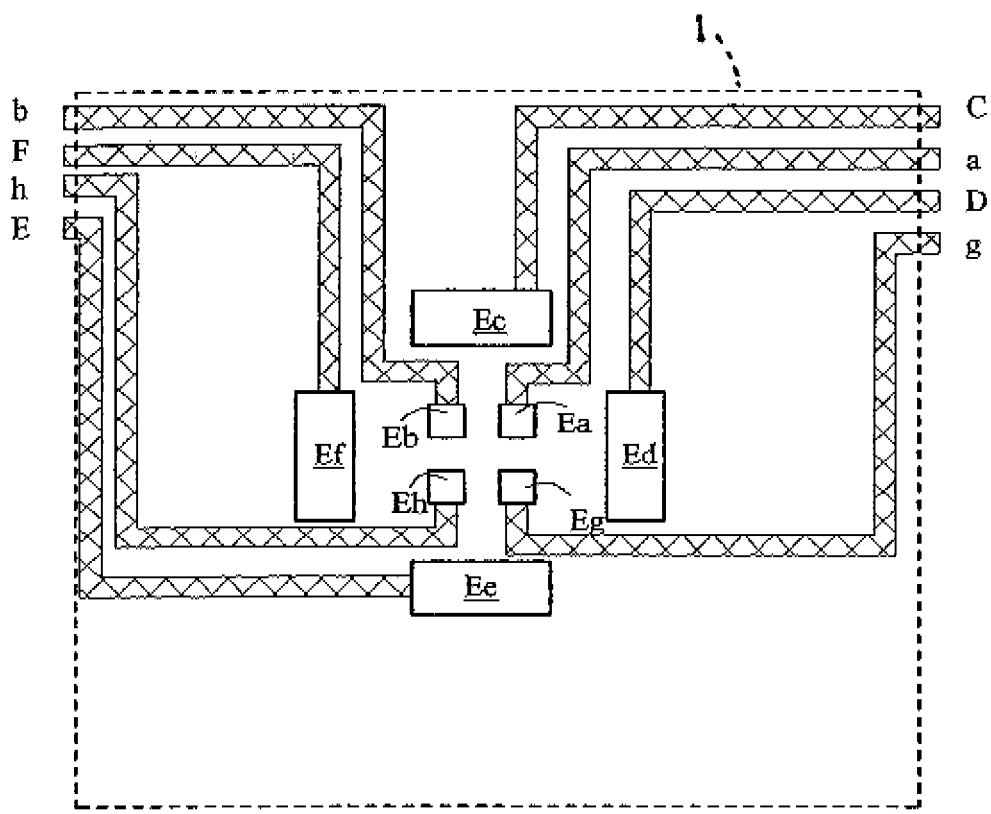
FIGS. 6 and 7 depict third and fourth embodiments with eight electrodes of a print sensor according to the invention.
Figure 7:
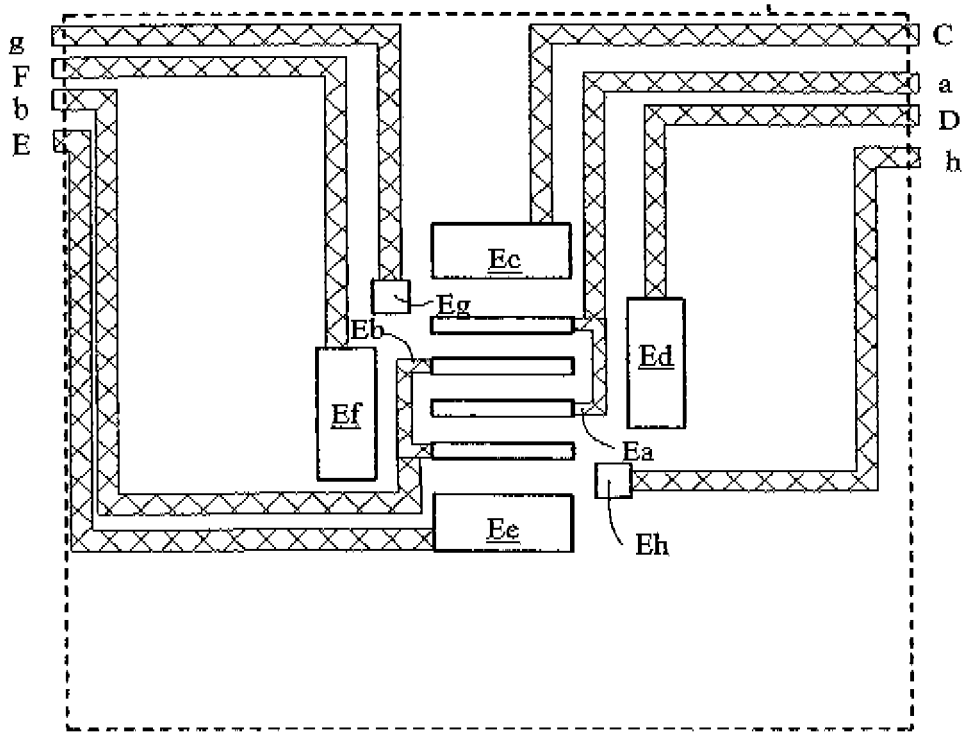

In the third and fourth embodiments of the sensor according to the invention, the measuring electrodes are eight in number, that is to say four large electrodes Ec, Ed, Ee and Ef and four small electrodes Ea, Eb, Eg and Eh. These embodiments are depicted in FIGS. 6 and 7. In the third embodiment, the sensor 1 comprises two sets of four single-piece electrodes with identical surface areas within each set, whilst in the fourth embodiment the sensor 1 comprises a first set of four single-piece electrodes with identical surface areas and a second set of two single-piece electrodes with identical surface areas and a third set of two electrodes in the form of intersecting combs with identical surface areas. The measurements of impedance Z for each of the embodiments are made in an identical manner. The impedances Zah and Zbg are measured between the small electrodes Ea, Eh and Eb, Eg and either the impedance Zce is measured if the finger covers the corresponding electrodes or if such is not the case Zdb or Zfa or Zab. It is also possible to measure the impedance Zfd if the corresponding electrodes are covered by the finger D, otherwise Zcb or Zeg or Zgh is measured.

The invention claimed is:

1. A method of determining a living character of a finger of a person carrying a fingerprint using a microprocessor to perform the steps of:
   (a) making a first measurement of impedance of the finger between two first electrodes with a first predetermined surface area and determining one curve among several curves, each of said several curves satisfying a law of variation of impedance Z measured by the two first electrodes as a function of the surface area (S) of the two first electrodes covered by the fingerprint of a finger at a time t, that is, $Z=f_{Dt}(S)$, said one curve being determined by selecting the curve containing the point with coordinates (first predetermined surface area, measured impedance);
   (b) making a second measurement of impedance between two second electrodes with a second predetermined surface area different from said first predetermined surface area; and
   (c) checking that the point defined by the second predetermined surface area and the second impedance measurement values belongs to an area of tolerance situated around said one curve.

2. A method according to claim 1, wherein the second impedance measurement is made randomly between two electrodes of the same size and two electrodes of different sizes.

3. A method according to claim 1, wherein the second impedance measurement is made alternately between two electrodes of the same size and between two electrodes of different sizes.

4. A fingerprint sensor adapted to determine a living character of a finger carried by a person, the sensor comprising:
   (a) at least four electrodes, wherein at least two of the said at least four electrodes have smaller surfaces than the other two of the said four electrodes with larger surfaces;
   (b) means for measuring impedances at least between on the one hand, two electrodes with smaller surfaces and on the other hand, two electrodes with larger surfaces;
   (c) means for determining one curve among several curves, each of said several curves satisfies a law of variation of an impedance Z measured by said two electrodes with smaller surfaces or by said two electrodes with larger surfaces, as a function of the surface area (S) of the electrodes covered by the fingerprint of a finger at a time t, that is, $Z=f_{Dt}(S)$, said one curve being determined by selecting the curve containing the point with the coordinates (first predetermined surface area, measured impedance); and
   (d) means for checking that the point defined by the unselected surface area and the other unselected impedance measurement values belongs to an area of tolerance situated around said one curve.

5. A fingerprint sensor according to claim 4, wherein the two electrodes with smaller surfaces are less distant from each other than the two electrodes with larger surfaces.

6. A fingerprint sensor according to claim 4, further comprising an optical system producing an image of the fingerprint and determining the surface area of the electrodes not entirely covered by the fingerprint.

7. A fingerprint sensor adapted to determine a living character of a finger of a person carrying a fingerprint, the sensor comprising:
   (a) a first set of four single-piece electrodes with identical large surfaces and a second set of two electrodes in the form of intersecting combs with identical surfaces less than the identical large surfaces;
   (b) means for measuring the impedances between electrodes selected from the group consisting of: two of the electrodes with smaller surfaces; two of the electrodes with larger surfaces; and one of the electrodes with smaller surfaces and one of the electrodes with larger surfaces; and
   (c) means of checking that the impedances measured by the measuring means follow a predetermined law of variation of the impedance measured by the electrodes as a function of the surface area of the electrodes used for the measurement.

8. A fingerprint sensor adapted to determine a living character of a finger of a person carrying a fingerprint, the sensor comprising:
   (a) a first set of four single-piece electrodes with identical large surfaces and a second set of four single-piece electrodes with identical surfaces smaller than the identical large surfaces;
   (b) means for measuring the impedances between electrodes selected from the group consisting of: two of the electrodes with smaller surfaces; two of the electrodes with larger surfaces; and one of the electrodes with smaller surfaces and one of The electrodes with larger surfaces, and
   (c) means of checking that the impedances measured by the measuring means follow a predetermined law of variation of the impedance measured by the electrodes as a function of the surface area of the electrodes used for the measurement, the law of variation being related to a finger of a person carrying the fingerprint.

9. A fingerprint sensor adapted to determine a living character of a finger of a person carrying a fingerprint, the sensor comprising:
   (a) a first set of four single-piece electrodes with identical large surfaces and a second set of two single-piece electrodes with identical surfaces smaller than the identical large surfaces and a third set of two electrodes in the form of intersecting combs with identical surfaces smaller than the identical large surfaces;

(b) means for measuring the impedances between electrodes selected from the group consisting of: one electrode from the second set and one electrode from the third set; two electrodes of the first set; one electrode from the first set and one electrode from the third set; one electrode from the first set and one electrode from the second set; two electrodes of the second set, and two electrodes of the third set; and (c) means of checking that the impedances measured by the measuring means follow a predetermined law of variation of the impedance measured by the electrodes as a function of the surface area of the electrodes used for the measurement, the law of variation being related to a finger of a person carrying the fingerprint.

* * * * *

UNITED STATES PATENT AND TRADEMARK OFFICE
CERTIFICATE OF CORRECTION

| | | |
|---|---|---|
| PATENT NO. | : 7,567,690 B2 | Page 1 of 1 |
| APPLICATION NO. | : 10/539822 | |
| DATED | : August 4, 2009 | |
| INVENTOR(S) | : Jean-Christophe Fondeur, Joel-Yann Fourre and Laurent Lambert | |

It is certified that error appears in the above-identified patent and that said Letters Patent is hereby corrected as shown below:

On the title page

Item (75) Inventors:

Delete "Jean-Christophe Foundeur" and in its place -- Jean-Christophe Fondeur --

Signed and Sealed this
Eleventh Day of October, 2011

David J. Kappos
*Director of the United States Patent and Trademark Office*